United States Patent
Prokopenko et al.

(10) Patent No.: US 9,563,907 B2
(45) Date of Patent: Feb. 7, 2017

(54) OFFER BASED PROVISION OF FEE BASED NETWORK ACCESS

(71) Applicant: Rawllin International Inc., Tortola (VG)

(72) Inventors: Anton Prokopenko, Saint-Petersburg (RU); Artem Kirakosyan, Saint-Petersburg (RU); Anatoly Rukavitsa, Lisiy Nos (RU); Denis Kulikov, Saint-Petersburg (RU)

(73) Assignee: VIGO SOFTWARE LTD, Nicosia (CY)

( * ) Notice: Subject to any disclaimer, the term of this patent is extended or adjusted under 35 U.S.C. 154(b) by 331 days.

(21) Appl. No.: 13/917,232

(22) Filed: Jun. 13, 2013

(65) Prior Publication Data

US 2014/0372267 A1 Dec. 18, 2014

(51) Int. Cl.
| | |
|---|---|
| *G06F 19/00* | (2011.01) |
| *G06Q 30/04* | (2012.01) |
| *H04L 12/26* | (2006.01) |
| *H04L 12/14* | (2006.01) |
| *H04M 15/00* | (2006.01) |
| *H04L 29/08* | (2006.01) |
| *H04L 12/24* | (2006.01) |

(52) U.S. Cl.
CPC ........... *G06Q 30/04* (2013.01); *H04L 12/1485* (2013.01); *H04L 43/0847* (2013.01); *H04L 67/16* (2013.01); *H04L 67/322* (2013.01); *H04M 15/80* (2013.01); *H04M 15/8016* (2013.01); *H04M 15/82* (2013.01); *H04L 41/0253* (2013.01); *H04L 41/18* (2013.01); *H04L 41/5029* (2013.01); *H04L 43/087* (2013.01)

(58) Field of Classification Search
None
See application file for complete search history.

(56) References Cited

U.S. PATENT DOCUMENTS

| | | | |
|---|---|---|---|
| 6,363,357 | B1 | 3/2002 | Rosenberg et al. |
| 6,425,010 | B1 | 7/2002 | Alles et al. |
| | | (Continued) | |

FOREIGN PATENT DOCUMENTS

WO 01/89190 A2 11/2001

OTHER PUBLICATIONS

Altmann, "A Reference Model of Internet Service Provider Businesses", Accessed Nov. 13, 2013, 8 pages.

(Continued)

*Primary Examiner* — Paul Danneman
(74) *Attorney, Agent, or Firm* — Amin, Turocy & Watson, LLP

(57) ABSTRACT

Offer based provision of fee based network access is presented herein. An access component can provide a complementary access of first content of a network to a device without a per-access fee to a user account associated with the device. A monitor component can receive, from the device, a request for an alternate access of second content of the network that is different from the first content. The access component, based on a characteristic associated with the network determined to satisfy a defined condition with respect to the alternate access, can send an offer directed to the device for purchase of the alternate access with the per-access fee to the user account.

20 Claims, 11 Drawing Sheets

(56) References Cited

U.S. PATENT DOCUMENTS

| | | |
|---|---|---|
| 6,449,739 B1 | 9/2002 | Landan |
| 6,914,883 B2 | 7/2005 | Dharanikota |
| 7,353,267 B1 | 4/2008 | Cunningham et al. |
| 7,536,561 B2 | 5/2009 | Warnock et al. |
| 7,602,723 B2 | 10/2009 | Mandato et al. |
| 7,647,259 B2 | 1/2010 | de Fabrega |
| 7,848,312 B2 | 12/2010 | Zhang et al. |
| 7,895,297 B2 | 2/2011 | Gorodyansky |
| 7,917,749 B2 | 3/2011 | Ginter et al. |
| 8,085,713 B2 | 12/2011 | Kang |
| 8,111,618 B2 | 2/2012 | Li et al. |
| 8,131,262 B2 | 3/2012 | Trioano et al. |
| 8,145,263 B2 | 3/2012 | van Rooyen |
| 8,191,117 B2 | 5/2012 | Lapidous |
| 8,296,192 B2 | 10/2012 | Bullock |
| 8,543,842 B2 | 9/2013 | Ginter et al. |
| 8,635,128 B2 | 1/2014 | Fan et al. |
| 8,776,175 B1 | 7/2014 | Hermes |
| 8,793,305 B2 | 7/2014 | Fiatal |
| 9,412,122 B2 | 8/2016 | Trauberg |
| 2001/0039497 A1 | 11/2001 | Hubbard |
| 2002/0194251 A1 | 12/2002 | Richter et al. |
| 2003/0229588 A1 | 12/2003 | Falk et al. |
| 2005/0022001 A1 | 1/2005 | Bahl et al. |
| 2006/0085478 A1 | 4/2006 | Landau et al. |
| 2006/0195856 A1 | 8/2006 | Solomon et al. |
| 2006/0259359 A1 | 11/2006 | Gogel |
| 2008/0004978 A1 | 1/2008 | Rothschild |
| 2008/0016533 A1 | 1/2008 | Rothschild |
| 2009/0287764 A1* | 11/2009 | Pazhyannur .......... H04L 63/102 709/203 |
| 2010/0107225 A1 | 4/2010 | Spencer et al. |
| 2010/0332615 A1 | 12/2010 | Short et al. |
| 2011/0145115 A1 | 6/2011 | Kim et al. |
| 2011/0166918 A1* | 7/2011 | Allaire ............... G06Q 30/0239 705/14.7 |
| 2011/0302017 A1 | 12/2011 | Marti et al. |
| 2013/0080895 A1* | 3/2013 | Rossman ............ G06F 3/04883 715/720 |
| 2013/0254082 A1 | 9/2013 | Zuber |

OTHER PUBLICATIONS

Turbo Internet Accelerator Features (New Version 2.1), published online, Accessed Nov. 13, 2013, 2 pages.

Wikipedia. "Freemium", published online at [http://en.wikipedia.org/wiki/Freemium], Accessed Nov. 13, 2013, 5 pages.

Wikipedia. "Free-to-play", published online at [http://en.wikipedia.org/wiki/Free-to-play], Accessed Nov. 13, 2013, 7 pages.

Wikipedia. "Spotify", published online, Accessed Nov. 13, 2013, 27 pages.

Weinberg, "Speed's Other Needs" published online at [http://techcrunch.com/2012/09/23/speeds-other-needs/], on Sep. 23, 2012, 3 pages.

Office Action dated Apr. 8, 2015 for U.S. Appl. No. 13/784,228, 41 Pages.

Patentability Search Report; Data Acquisition Pertaining to Connectivity of Client Devices of Provider Network, and corresponding Availability/Utilization of Provider Network; Sep. 1, 2012, 11 pages.

Patentability Search Report; "A network service management system that provides fee-based network services, billing on a per-use basis for consumed network content"; Dec. 12, 2012; 10 pages.

Office Action dated Dec. 23, 2015 for U.S. Appl. No. 13/784,228, 30 pages.

Office Action dated Jul. 14, 2016 for U.S. Appl. No. 14/067,458, 43 pages.

Office Action dated Nov. 1, 2016 for U.S. Appl. No. 14/067,458, 18 pages.

Notice of Allowance dated Dec. 1, 2016 for U.S. Appl. No. 13,784,228, 30 pages.

\* cited by examiner

OFFER BASED PROVISION OF FEE BASED NETWORK ACCESS

TECHNICAL FIELD

The subject disclosure relates generally to network services, and more particularly to switching from access of a network without a per-use fee to a user to fee based access of the network with a fee to the user corresponding to an offer for the fee based access.

BACKGROUND

With the advent of the Internet and widespread consumer access to network data content, conventional systems have expanded to providing Internet services to devices, mobile devices, etc. For instance, conventional network service techniques can enable a device, a wireless device, etc. to access an Internet service according to a usage plan designating a maximum amount of data, type of data, etc. that can be accessed by the device during a predetermined billing period. However, such techniques cannot optimally provide access to network services.

The above-described deficiencies of today's network service techniques and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It can also be appreciated that the detailed description will include additional or alternative embodiments beyond those described in this summary.

In accordance with one or more embodiments and corresponding disclosure, various non-limiting aspects are described in connection with switching from access of a network by a device without a per-use fee, per-access fee, etc. to a user to fee based access of the network by the device with a fee to the user corresponding to an offer for the fee based access.

In an aspect, an offer-for-access provisioning component can provide a complementary, e.g., without the per-use fee, per-access fee, etc. access of first content, e.g., text, a rich site summary (RSS) feed, an email, etc. of a network to a device, e.g., a wireless device, a wired device, a mobile device, etc. without the per-use fee, per-access fee, etc. to a user account associated with the device. Further, the offer-for-access provisioning component can receive, from the device, a request for an alternate access of second content, e.g., a video stream, an audio stream, hypertext transfer protocol secure (HTTPS) based information, etc. of the network. In response to receiving the request, the offer-for-access provisioning component can send an offer directed to the device for purchase of the alternate access with the fee, per-use fee, per-access fee, etc. to the user account according to a characteristic associated with the network determined to satisfy a predetermined condition with respect to the alternate access.

In one or more aspects, the offer-for-access provisioning component can determine whether the characteristic of the network, e.g., level of data transfer, quality of service, etc. provided, currently provided, etc. via service(s), request(s), etc. of the network is sufficient to support provisioning of the alternate access. The characteristic can comprise a bit rate, a bit error rate, a delay, a jitter, a packet dropping probability, etc., a radio condition associated with the device, a utilization of a resource of a base station, e.g., a wireless access point, etc. associated with the device, an amount of resources allocated to the base station, a type of the resource allocated to the base station, etc. Further, in response to the offer-for-access provisioning component determining that the characteristic is greater than or equal to a minimum level of data transfer, quality of service, etc. to support provisioning of the alternate access, the offer-for-access provisioning component can send the offer directed to the device via a plug-in of an Internet browser of the device, an application of an operating system, e.g., a native application, of the device, etc.

In one aspect, the first content can be associated with a first rate of data transfer and/or a first quality of service, e.g., associated with Internet browsing of text, images, etc. that is less than a second rate of data transfer and/or a second quality of service associated with the second content, e.g., associated with Internet download and/or access of video streams, audio streams, etc.

In other aspect(s), the offer-for-access provisioning component can receive, detect, etc. an input from the device representing an acceptance of the offer, e.g., associated with selection of an icon displayed on an interface of the device via the plug-in, the native application, etc. Further, based on the input, the offer-for-access provisioning component can provide the alternate access, e.g., associated with a specified bandwidth and traffic type, to the device, e.g., based on a predetermined time frame. Furthermore, offer-for-access provisioning component can apply the fee, the per-use fee, the per-access fee, etc. to the user account, e.g., upon receiving information, for example, representing the second access was provided successfully to the device, representing a minimum level of service, quality of service, data transfer rate, etc. was provided to the device for a predetermined period of time, e.g., after detection of an acceptance of the request, etc.

In one non-limiting implementation, a method can include providing, by a system comprising a processor, a first access of first content, e.g., text, an RSS feed, an email, etc. of a network to a device without a per-use fee, per access fee, etc. to a user account associated with the device. Further, the method can include receiving, by the system, a request for a second access of second content, e.g., a video stream, an audio steam, HTTPS based information, etc. of the network from the device that is different from the first content, e.g., the second content associated with a quality of service, a rate of data transfer, etc. that is higher than another quality of service, rate of data transfer, etc. associated with the first content.

Further, in response to determining that a characteristic, e.g., a bit rate, a bit error rate, a delay, a jitter, a packet dropping probability, a radio condition associated with the device, a utilization of a resource of a base station associated with the device, an amount of resources allocated to the base station, a type of the resource allocated to the base station, etc. of the network satisfies a predetermined condition with respect to the second access, e.g., determining that the characteristic is greater than or equal to a minimum level of data transfer, quality of service, etc. to support provisioning of the alternate access, the method can include sending, by the system, an offer directed to the device, e.g., via a plug-in of an Internet browser of the device, an application of an operating system, e.g., a native application, of the device, etc. for purchase of the second access with the fee, per-use fee, per-access fee, etc. to the user account.

In an aspect, the method can include receiving, by the system, an input from the device representing an acceptance of the offer, and providing, by the system, the second access to the device based on the input. Further, the method can include charging, by the system, the fee, per-use fee, per-access fee, etc. to the user account, e.g., upon receiving information, e.g., representing the second access was provided successfully to the device, a minimum level of service, quality of service, data transfer rate, etc. was provided to the device for a predetermined period of time, e.g., after receiving the input, etc.

Another non-limiting implementation can include a computer-readable storage medium comprising computer executable components that, in response to execution, cause a computing system comprising a processor to perform operations. Such operations can include providing an initial access of first content, e.g., text, an RSS feed, an email, etc. of a network to a device without a fee to a user account associated with the device. Further, the operations can include receiving a request from the device for a substitute access of second content of the network—the initial access associated with a level of data transfer, quality of service, etc. of the network, e.g., which is lower than another level of data transfer, quality of service, etc. of the network associated with the request for the substitute access.

Furthermore, the operations can include sending an offer directed to the device for purchase of the substitute access with the fee, e.g., a per-use fee, a per-access fee, etc. to the user account, in response to determining that a characteristic, e.g., a bit rate, a bit error rate, a delay, a jitter, a packet dropping probability, a radio condition associated with the device, a utilization of a resource of a base station associated with the device, an amount of resources allocated to the base station, a type of the resource allocated to the base station, etc. of the network satisfies a predetermined condition with respect to the substitute access, e.g., the characteristic is greater than or equal to a minimum level of data transfer, quality of service, etc. to support provisioning of the substitute access.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Figure 1:
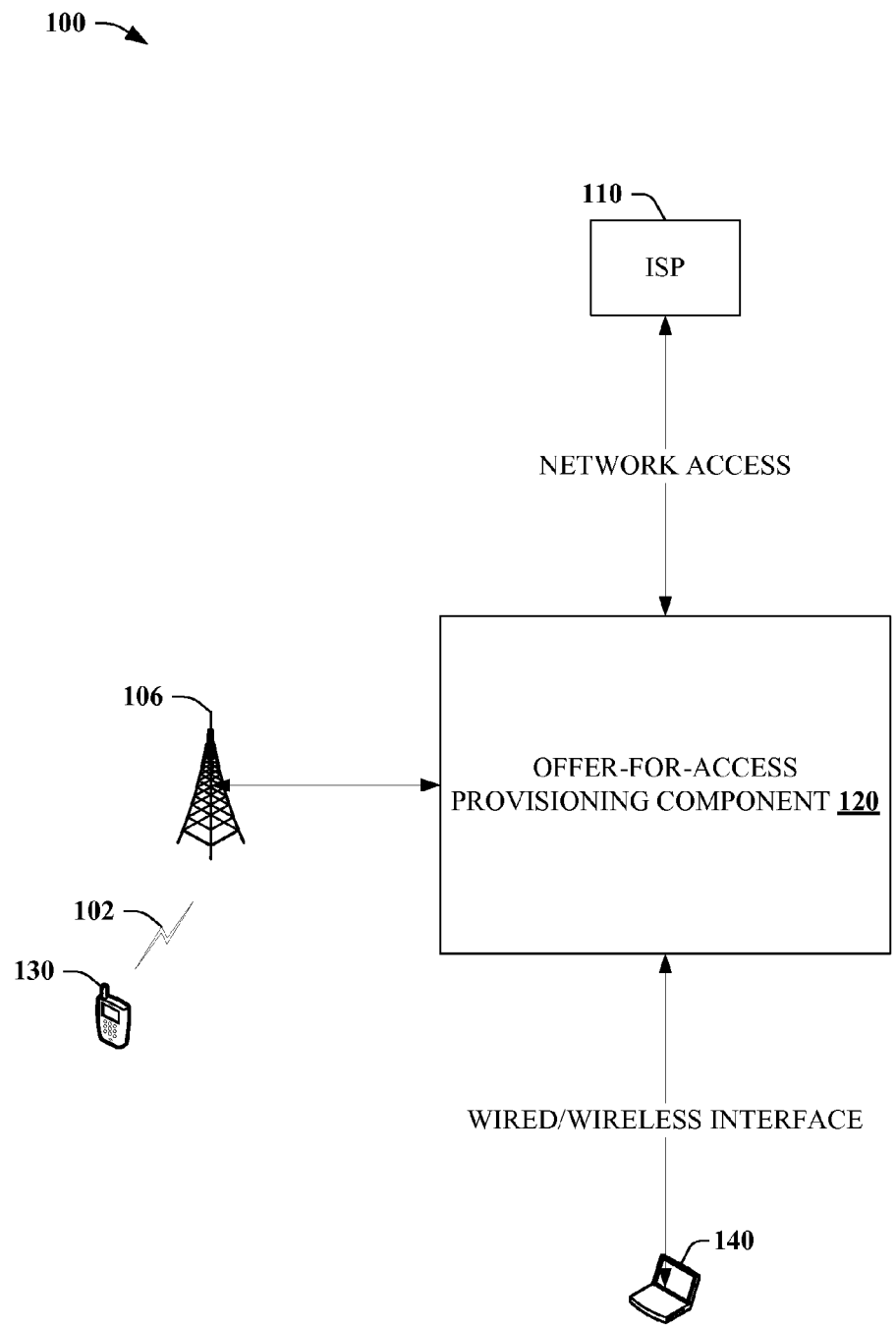
FIG. 1 illustrates a block diagram of a network environment, in accordance with one or more embodiments.

Various non-limiting embodiments of systems, methods, and apparatus presented herein facilitate switching from a first access, wireless access, etc. of a network to an alternate access, wireless access, etc. of the network corresponding to an offer for the alternate access. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via monitor component 210 (see below), to determine whether a characteristic of a network, e.g., level of data transfer, quality of service, etc. provided, currently provided, etc. via an Internet service provider (ISP) is sufficient to support granting a request for an alternate access of content of the network.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As described above, conventional networked techniques cannot optimally provide access to network services. Compared to such technology, various systems, methods, and apparatus described herein in various embodiments can optimize subscriber use of service(s) of a network by offering access to requested service(s) in response to determining that the network can provide the requested service(s).

Referring now to FIG. 1, a block diagram of network environment 100 is illustrated, in accordance with one or more embodiments. Aspects of network environment 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Network environment 100 can include an offer-for-access provisioning component 120 that can switch from access of a network by a device, e.g., wireless device 130, wired/wireless device 140, etc. without a per-use fee, per-access fee, etc. to a user to fee based access of the network by the device with the per-use fee, per-access fee, etc. to the user corresponding to an offer for the fee based access.

For example, offer-for-access provisioning component 120 can provide a complementary, e.g., without a per-access fee, per-use fee, etc. of first content, e.g., text, an RSS feed, an email, etc. to the device, e.g., a wireless device, a wired device, a mobile device, etc. via Internet service provider (ISP) 110 without the per-use fee, per-access fee, etc. to a user account associated with the device. Further, offer-for-access provisioning component 120 can receive, from the device, e.g., via a wired interface, a wireless interface, etc. a request for an alternate access, via ISP 120, of second content, e.g., a video stream, an audio stream, HTTPS based information, etc.

In one or more aspects, offer-for-access provisioning component 120 can determine whether a characteristic associated with ISP 110, e.g., a level of data transfer, a quality of service, etc. associated with service(s) provided, currently provided, etc. by ISP 110 is sufficient to support provisioning of the alternate access. The characteristic can comprise a bit rate, a bit error rate, a delay, a jitter, a packet dropping probability, etc., a radio condition, e.g., electromagnetic interference, etc. associated with the device, a utilization of a resource, e.g., a communication channel, of base station 106, an amount of resources, e.g., communication channels, frequencies, etc. allocated to base station 106, a type or condition, e.g., transmission power, etc. of the resource allocated to base station 106, etc.

Further, in response to offer-for-access provisioning component 120 determining that the characteristic is greater than or equal to a minimum level of data transfer, quality of service, etc. associated with ISP 110 that can support the provisioning of the alternate access, offer-for-access provisioning component 120 can send the offer directed to the device, e.g., via a plug-in of the Internet browser of the device, via a native application of the device, etc. for purchase of the alternate access of the second content by the user with the per-use fee, per-access fee, etc. to the user account.

Figure 2:
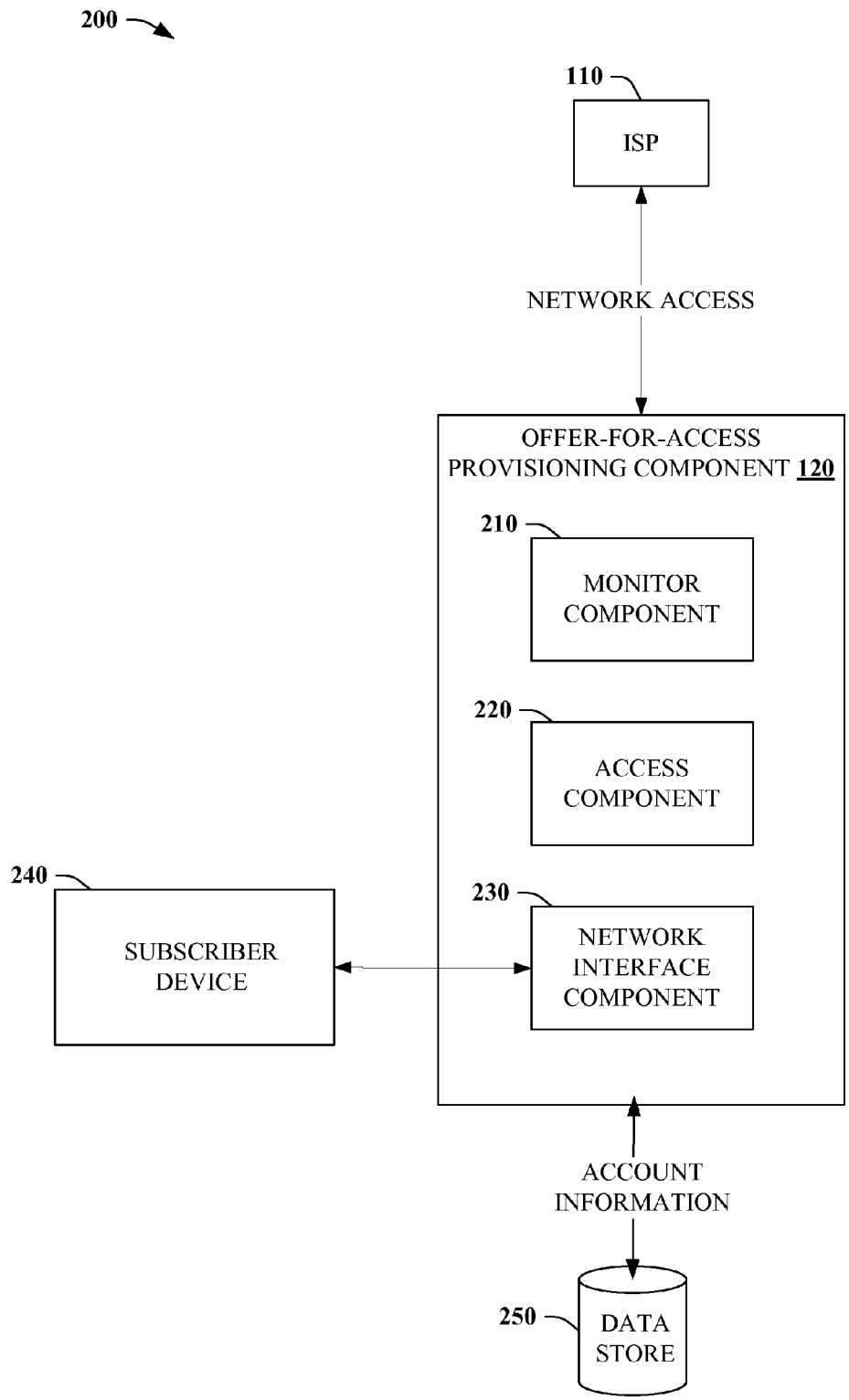
FIG. 2 illustrates a block diagram of another network environment, in accordance with one or more embodiments.

Now referring to FIG. 2, a block diagram of another network environment (200) is illustrated, in accordance with one or more embodiments. As illustrated by FIG. 2, offer-for-access provisioning component 120 can be communicatively coupled to data store 250, which can store information of an account of a user associated with subscriber device 240, e.g., wireless device 130, wired/wireless device 140, etc. For example, such account information can represent fees accrued via subscriber device 240 with respect to the alternate access of the second content. Further, free-to pay provisioning component 120 can include monitor component 210, access component 220, and network interface component 230.

In an aspect, offer-for-access provisioning component 120 can be communicatively coupled, via network interface component 230, to subscriber device 240, e.g., a cellular device, a mobile phone, etc. utilizing base station 106, e.g., comprising a wireless access point, etc. and over-the-air wireless link 102 of a wireless infrastructure. Electronics, circuitry, components, etc. of the wireless infrastructure, network interface component 230, etc. can include substantially any wireless telecommunication or radio technology, e.g., wireless fidelity (Wi-Fi™); Bluetooth™ Worldwide Interoperability for Microwave Access (WiMAX™); Enhanced General Packet Radio Service (GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), etc.

In another aspect, network interface component 230 can communicate with ISP 110, wireless device 130, wired/wireless device 140, etc. via an Internet Protocol (IP) based network, such as the Internet, a local network, a wide area network, an intranet, or the like. It should be appreciated that network interface component 230 can communicate with ISP 110, wireless device 130, wired/wireless device 140, etc. via IP based communication or data transfer protocols, or IP in conjunction with one or more other protocols, in one or more aspects of the subject disclosure.

In yet another aspect, access component 220 can provide, via ISP 110, a complementary, e.g., without a per-use fee, without a per-access fee, etc. access of first content, e.g., text, an RSS feed (e.g., a blog entry, a news headline, audio based information, video based information, etc.), an email, etc. to subscriber device 240 without charging the per-use fee, the per-access fee, additional fee(s), etc. to an account of a user associated with subscriber device 240.

Further, network interface component 230 can receive, from subscriber device 240, a request for an alternate access of second content, e.g., a video stream, an audio stream, HTTPS based information, etc. via ISP 110—the first content associated with a first rate of data transfer and/or a first quality of service, e.g., associated with Internet browsing of text, images, etc. that is less than a second rate of data transfer and/or a second quality of service associated with the second content, e.g., associated with Internet download, access, etc. of video streams, audio streams, etc.

Based on the request for the alternate access, monitor component 210 can determine whether a characteristic of the network, e.g., level of data transfer, quality of service, etc. provided, currently provided, etc. via ISP 110 is sufficient to support granting the request for the alternate access and/or provisioning of the alternate access. The characteristic can comprise a bit rate, a bit error rate, a delay, a jitter, a packet dropping probability, etc., a radio condition associated with the device, a utilization of a resource of a base station, e.g., a wireless access point, etc. associated with the device, an amount of resources allocated to the base station, a type of the resource allocated to the base station, etc.

For example, monitor component 210 can acquire information pertaining to conditions of a network, e.g., network environment 200, and/or states of client devices of the network, e.g., associated with ISP 110, base station 106, etc. This information can be obtained from reporting performed by the client devices, as well as monitoring, e.g., performed by monitor component 210, of components of the network. In an aspect, monitor component 210 can receive traffic information about traffic types and/or consumption of traffic by subscribers of service(s) provided by ISP 110, e.g., associated with Internet browsing, audio streams, video streams, downloading content, HTTPS based access, etc. In another aspect, monitor component 210 can receive status information about a status of the network, a status of devices and/or components of the network, a utilization of resources of base station 106, condition(s) associated with over-the-air wireless link 102, etc.

Further, monitor component 210 can store the information pertaining to conditions of the network, e.g., traffic information, status information, etc., for example, using a data storage device, e.g., data store 250, for indicating suitability of available network resources for supporting the request for the alternate access and/or to determine whether sufficient network resources are available to provide a level of service, quality of service, data transfer, etc. associated with the request.

As such, access component 220 can evaluate such information and correlate real-time network conditions with levels of quality of service, data transfer, etc. to determine whether the characteristic is greater than or equal to a minimum level of service, e.g., data transfer, quality of service, etc. to support provisioning of the alternate access. In response to a determination that the characteristic is greater than or equal to the minimum level of data transfer, quality of service, etc. to support provisioning of the alternate access, access component 220 can send the offer directed to the device, e.g., via a plug-in of an Internet browser of the device, an application of an operating system, e.g., a native application, of the device, etc. for purchase of the alternate access with the per-use fee, the per-access fee, the additional fee(s), etc.

Network interface component 230 can receive, detect, etc. an input from subscriber device 240 representing an acceptance of the offer, e.g., associated with selection of an icon displayed on an interface of subscriber device 240 via the plug-in, the native application, etc. Further, based on the input, access component 220 can provide the alternate access to subscriber device 240, e.g., for a predetermined period of time, and apply, charge, etc. the per-use fee, the per-access fee, etc. to the account of the user associated with subscriber device 240.

In another aspect, monitor component 210 can determine whether the alternate access was successfully provided to subscriber device 240, e.g., whether a level of data transfer, a quality of service, etc. associated with the alternate access was provided to subscriber device 240 via ISP 110, e.g., for a predetermined period of time, e.g., after detection of the input. In yet another aspect, monitor component 210 can receive such information from components associated with network environment 200. Further, in response to a determination that the alternate access was successfully provided, access component 220 can apply, charge, etc. the per-use fee, the per-access fee, etc. to the account of the user, otherwise access component 220 can withhold such fee.

FIGS. 3-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
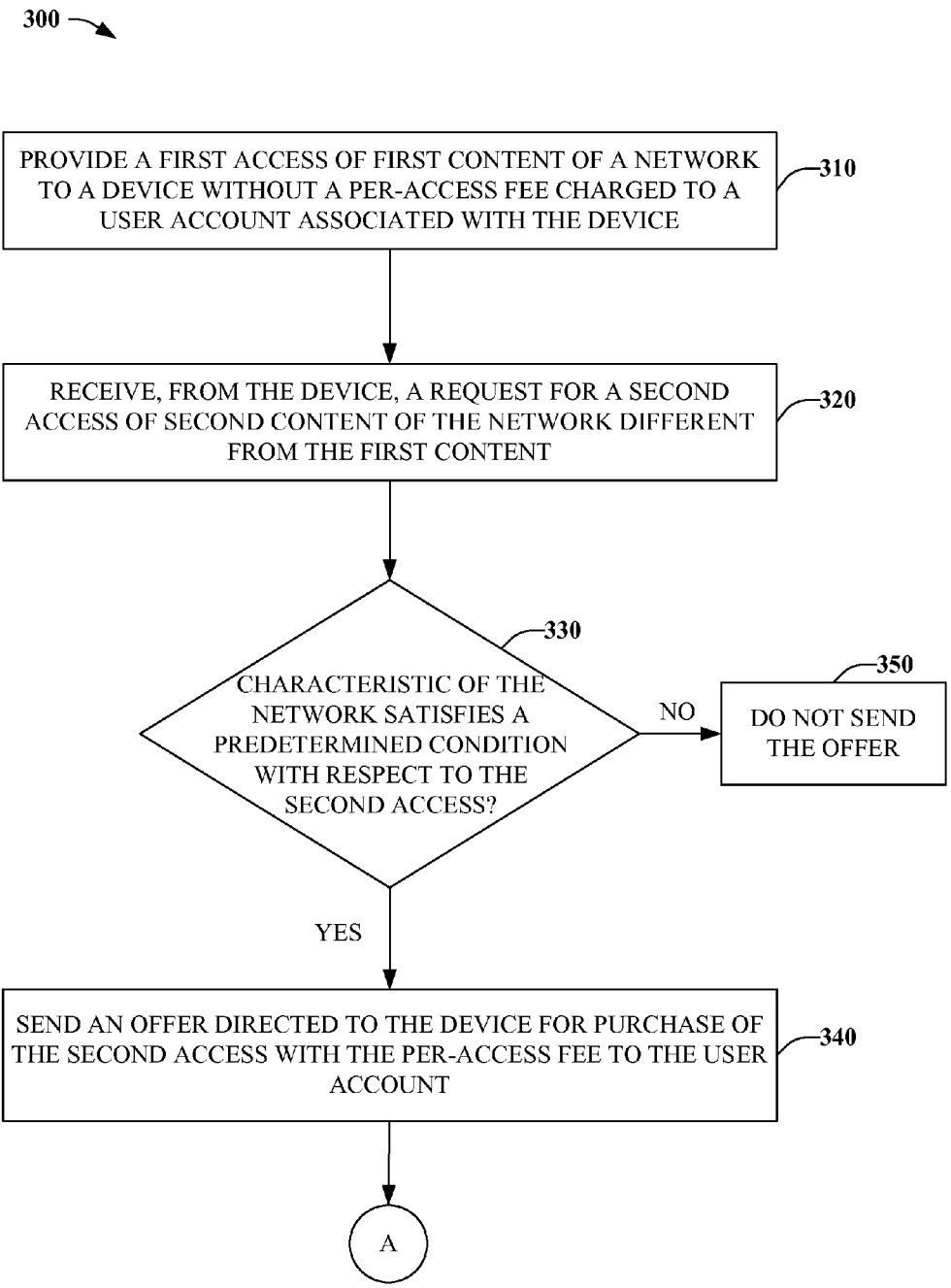
FIGS. 3-5 illustrate processes associated with an offer-for-access provisioning component, in accordance with one or more embodiments.
Figure 4:
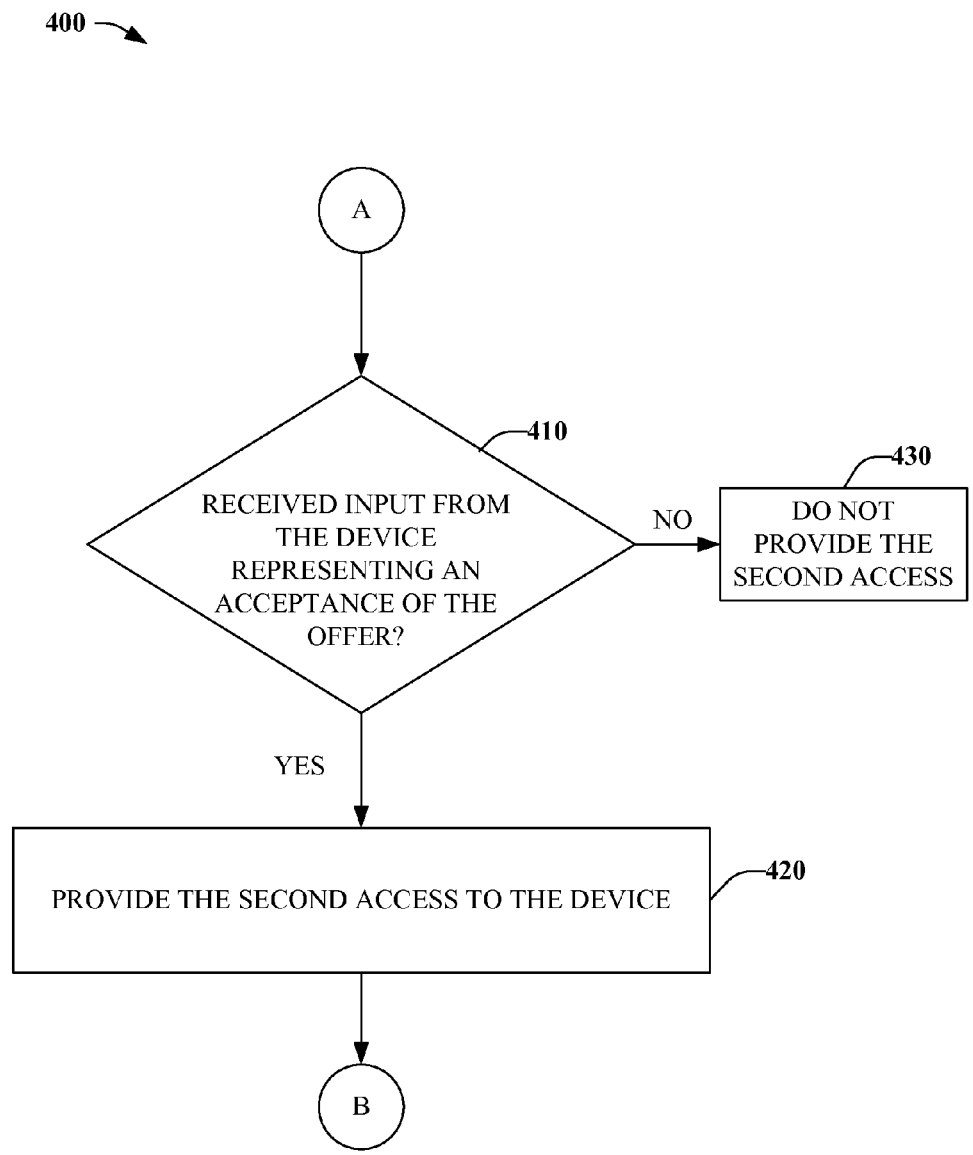
Figure 5:
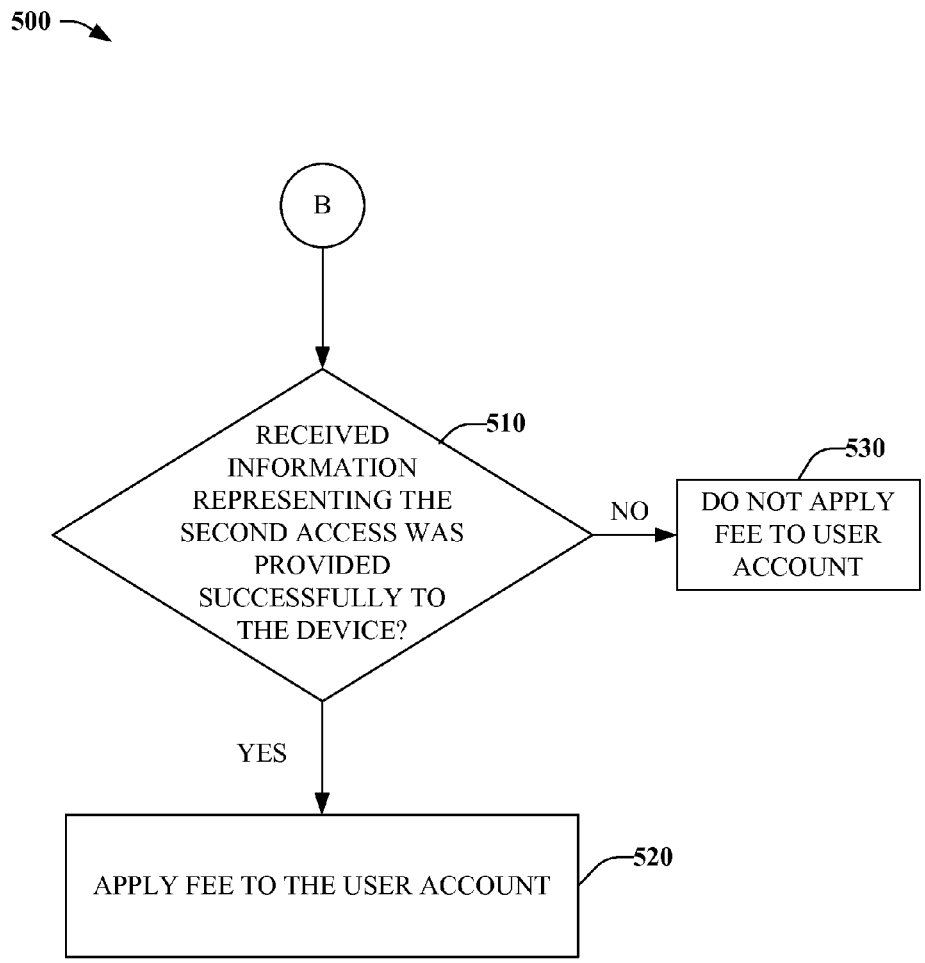
Figure 6:
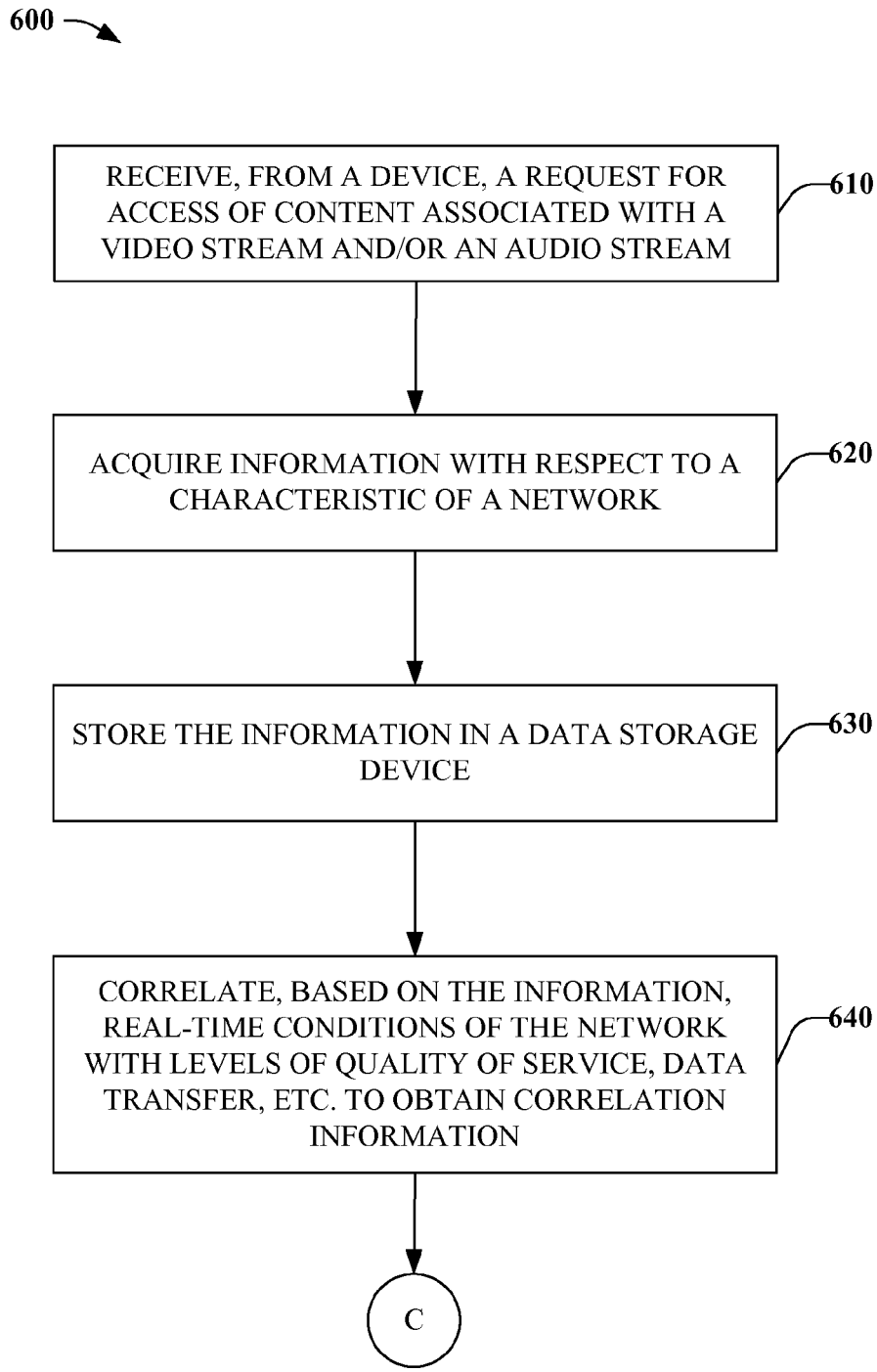
FIGS. 6-9 illustrate other processes associated with the offer-for-access provisioning component, in accordance with one or more embodiments.
Figure 7:
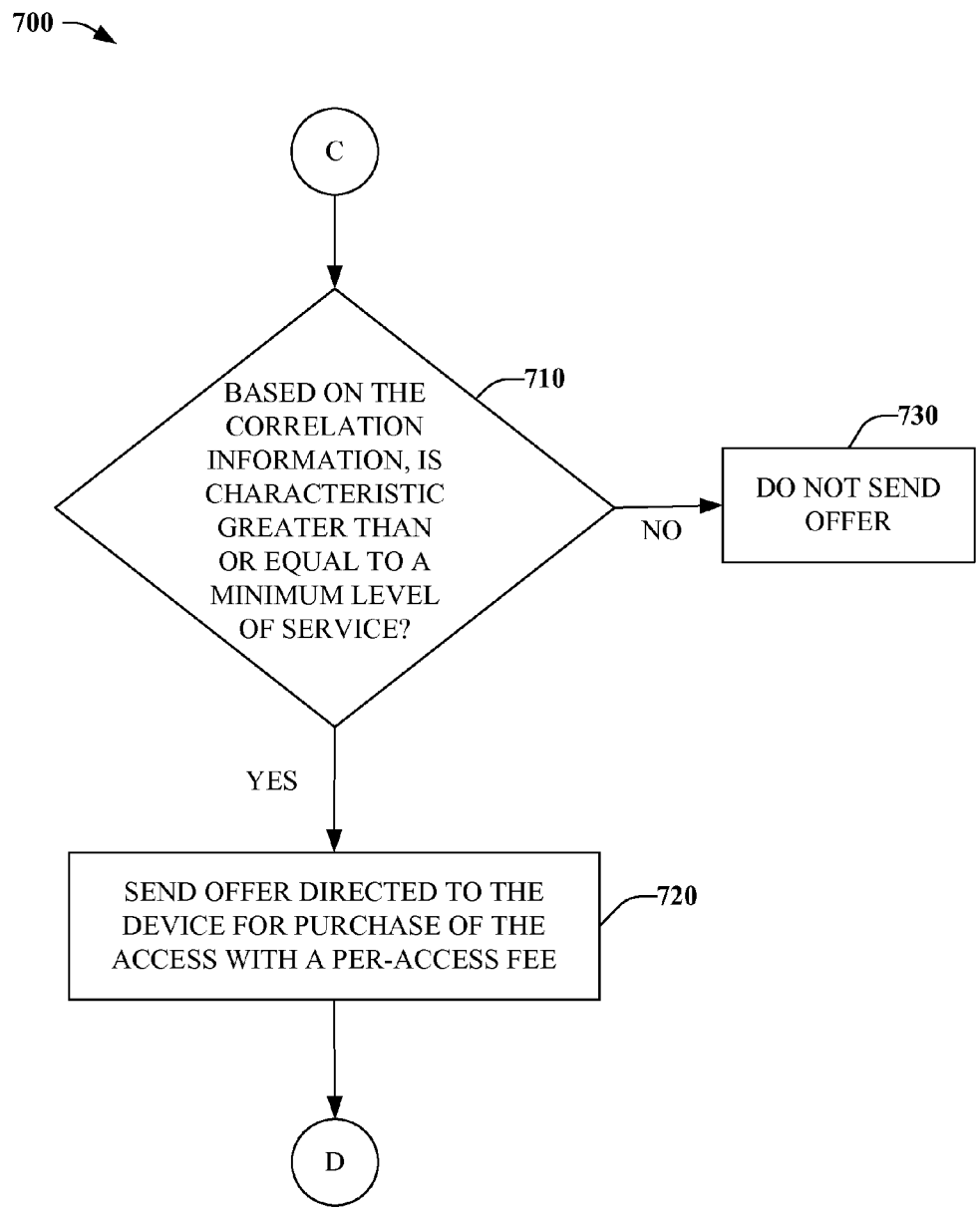
Figure 8:
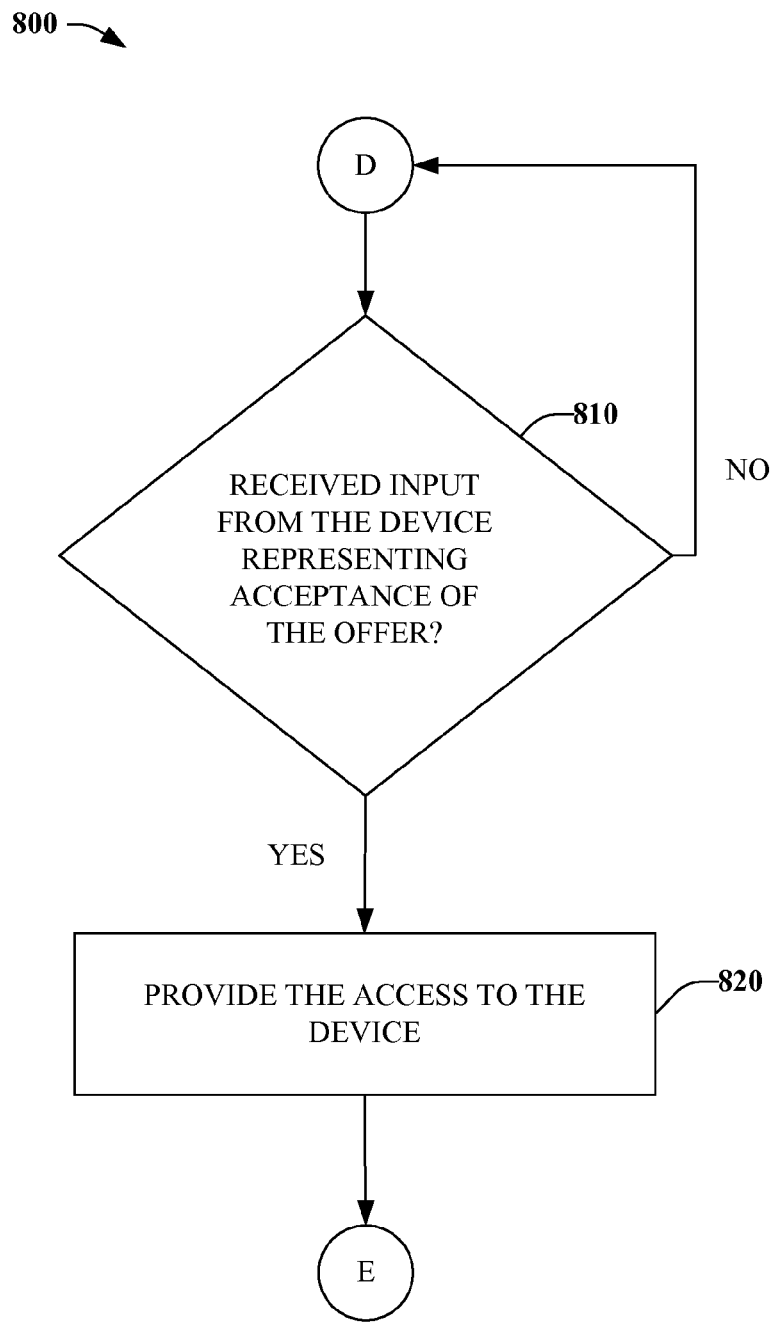
Figure 9:
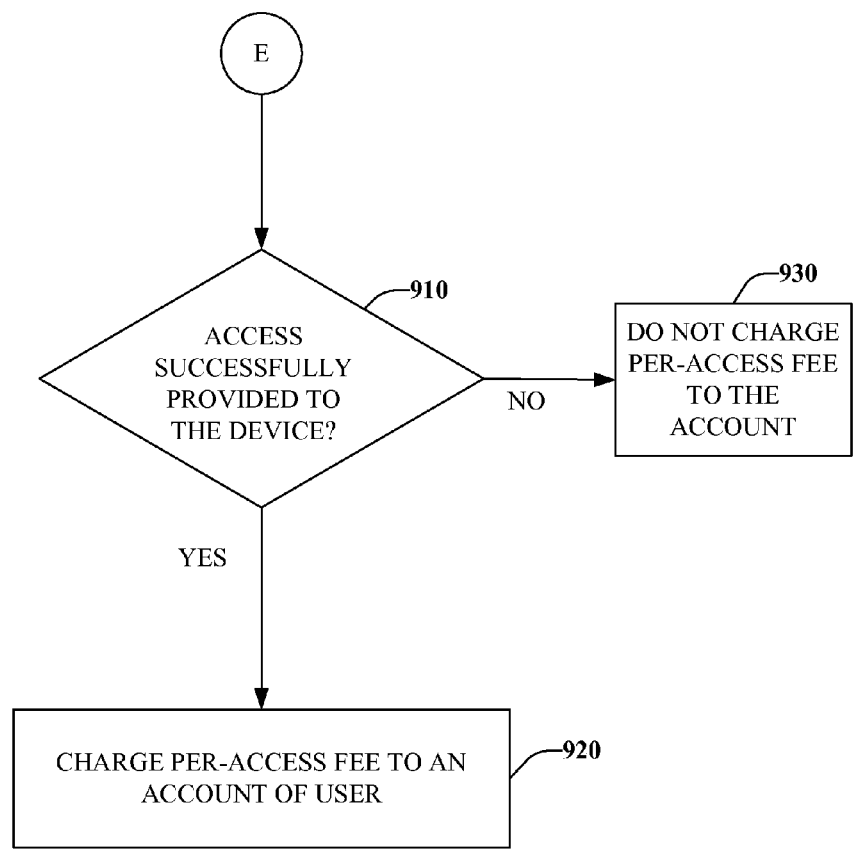

Referring now to FIGS. 3-5, processes 300 to 500 associated with offer-for-access provisioning component 120 are illustrated, in accordance with one or more embodiments. At 310, a first access of first content, e.g., text, an RSS feed, an email, etc. of a network can be provided by the offer-for-access provisioning component 120 to a device, without a per-use fee, per-access fee, etc. being charged to a user account associated with the device. At 320, offer-for-access provisioning component 120 can receive, from the device, a request for a second access of second content, e.g., a video stream, an audio stream, HTTPS based information, etc. of the network, wherein the first content is associated with a data transfer rate, quality of service, etc. that is different, e.g., lower in quality, level, etc. from another data transfer rate, quality of service, etc. associated with the second content.

A 330, it can be determined whether a characteristic of the network, e.g., a bit rate, a bit error rate, a delay, a jitter, a packet dropping probability, etc., a radio condition associated with the device, a utilization of a resource of a base station, e.g., a wireless access point, etc. associated with the device, an amount of resources allocated to the base station, a type of the resource allocated to the base station, etc. satisfies a predetermined condition with respect to the second access, e.g., the characteristic is greater than or equal to a minimum level of data transfer, quality of service, etc. to support provisioning of the second access.

If it is determined at 330 that the characteristic satisfies the predetermined condition, flow continues to 340, at which offer-for-access provisioning component 120 can send an offer directed to the device for purchase of the second access with the per-use fee, per-access fee, etc. to the user account; otherwise flow continues to 350, at which the offer is not sent to the device.

From 340, flow continues to 410, at which it can be determined whether an input was received from the device representing an acceptance of the offer. If it is determined at 410 that the input was received, flow continues to 420, at which offer-for-access provisioning component 120 can provide the second access, e.g., via ISP 110, to the device, e.g., based on a predetermined time frame, based on a specified bandwidth and traffic type; otherwise flow continues to 430, at which the second access is not provided to the device.

From 420, flow continues to 510, at which it can be determined whether information was received representing the second access was provided successfully to the device, representing a minimum level of service, quality of service, data transfer rate, etc. was provided to the device, e.g., for a predetermined period of time, etc. If it is determined at 510 that the information was received, flow continues to 520, at which offer-for-access provisioning component 120 can apply, charge, etc. the per-use fee, per-access fee, etc. to the user account; otherwise, flow continues to 530, at which such fee is not applied to the user account.

Now referring to FIGS. 6-9, processes 600 to 900 associated with offer-for-access provisioning component 120 are illustrated, in accordance with one or more embodiments. At 610, a request for access of content, e.g., associated with a video stream, an audio stream, etc. can be received from a device, e.g., by offer-for-access provisioning component 120. At 620, offer-for-access provisioning component can acquire information with respect to a characteristic of the network, e.g., traffic information about traffic types and/or consumption of traffic by subscribers of service(s) provided by ISP 110, e.g., associated with Internet browsing, audio streams, video streams, downloading content, HTTPS based access, status information about a status of the network, a status of devices and/or components of the network, a utilization of resources of base station 106, condition(s) associated with over-the-air wireless link 102, etc.

At 630, offer-for-access provisioning component 120 can store the acquired information in a data store, e.g., 250, a data storage device, etc. At 640, offer-for-access provisioning component 120 can correlate, based on the acquired information, real-time conditions of the network with levels of quality of service, data transfer, etc. to obtain correlation information.

From 640, flow continues to 710, at which it can be determined, based on the correlation information, whether the characteristic is greater than or equal to a minimum level, e.g., of service, quality of service, data transfer rate, etc. to support provisioning of the access. If it is determined at 710 that the characteristic is greater than or equal to a minimum level of service, e.g., associated with a rate of data transfer, a quality of service, etc., flow continues to 720, at which offer-for-access provisioning component 120 can send an offer directed to the device for purchase of the access with a per-access fee; otherwise, the offer is not sent at 730

From 720, flow continues to 810, at which it can be determined whether an input representing an acceptance of the offer was received, e.g., by offer-for-access provisioning component 120, from the device. If it is determined at 810 that the input was received, flow continues to 820, at which offer-for-access provisioning component 120 can provide, e.g., via ISP 110, the access to the device; otherwise flow returns to 810.

From 820, flow continues to 910, at which it can be determined whether the access was successfully provided to the device. For example, offer-for-access provisioning component 120 can query, monitor, etc. components of the network, the device, etc. to determine whether the minimum level of service was provided to the device for a period of time, e.g., after acceptance of the request, etc.

If it is determined at 910 that the minimum level of service was provided, flow continues to 920, at which the per-access fee can be assessed, charged, etc. to the account of the user; otherwise, flow continues to 930, at which the per-access fee is not charged, assessed, etc. to the account of the user.

Figure 10:
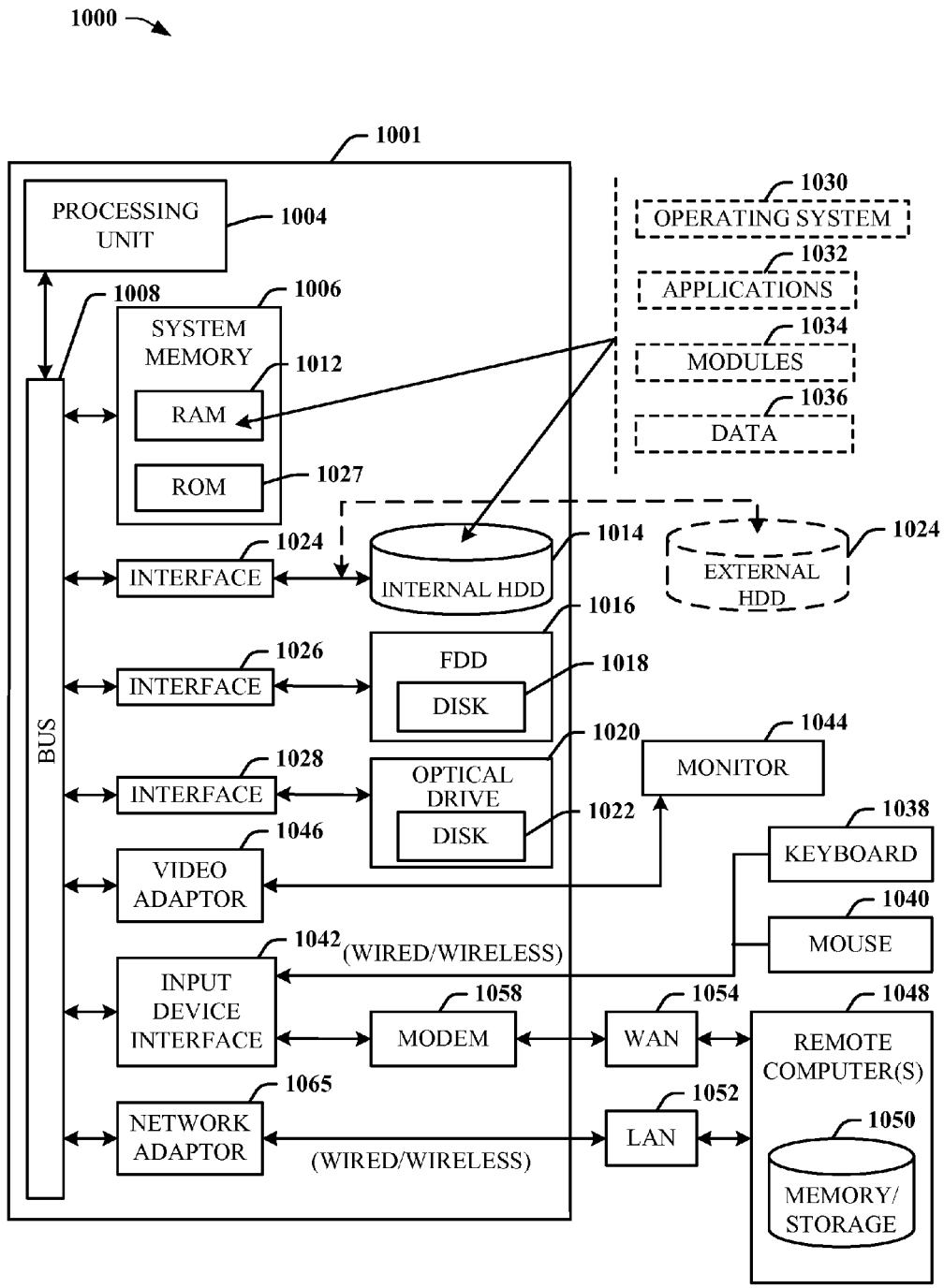
FIG. 10 illustrates a block diagram of a computing system operable to execute the disclosed systems and methods, in accordance with an embodiment.

With reference to FIG. 10, a block diagram of a computing system 1000 operable to execute the disclosed systems and methods is illustrated, in accordance with an embodiment. Computing system 1000 can include a computer 1002, the computer 1002 including a processing unit 1004, a system memory 1006 and a system bus 1008. The system bus 1008 connects system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1011 and random access memory (RAM) 1012. A basic input/output system (BIOS) is stored in a non-volatile memory 1011 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules and/or components can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that aspects of the subject disclosure can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or can be connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi® and Bluetooth™ wireless technologies. Thus, the communication can be a predefined structure as with a conventional network or simply an ad hoc communication between at least two devices.

Wi-Fi, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), or other bands (e.g., 802.11g, 802.11n, . . . ) so the networks can provide real-world performance similar to the basic 11BaseT wired Ethernet networks used in many offices.

Figure 11:
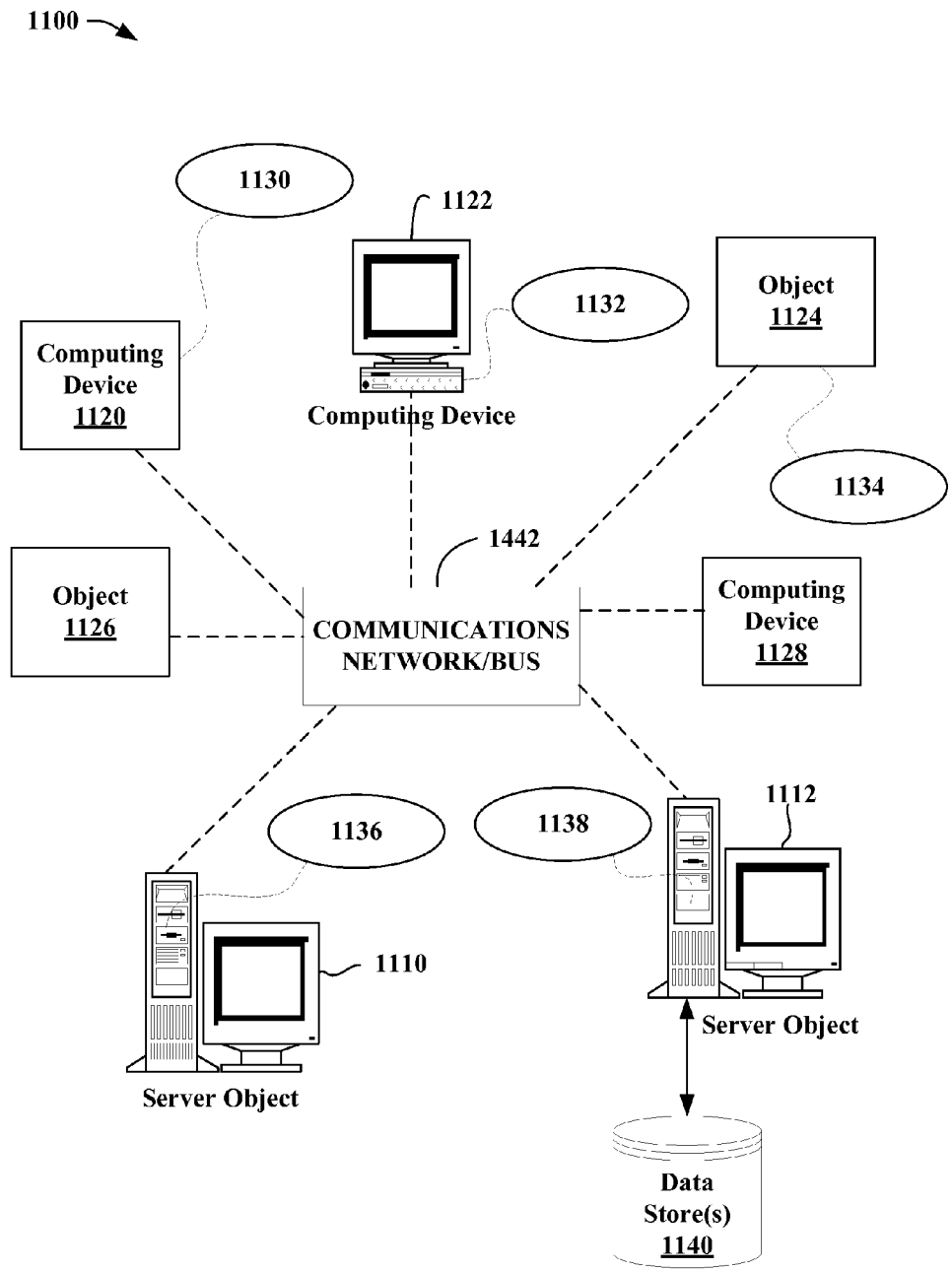
FIG. 11 illustrates a block diagram of a sample data communication network that can be operable in conjunction with various aspects described herein.

FIG. 11 provides a schematic diagram of an exemplary networked or distributed computing environment. The distributed computing environment comprises computing objects 1111, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1111, 1112, etc. and computing objects or devices 1120, 1122, 1124, 1126, 1128, etc. may comprise different devices, including component(s) associated with offer-for-access provisioning component 120, and/or other devices such as a mobile phone, personal digital assistant (PDA), audio/video device, MP3 players, personal computer, laptop, etc. It should be further appreciated that data store(s) 1140 can include data store 250.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques for search augmented menu and configuration functions provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for search augmented menu and configuration functions as described in various embodiments.

Thus, a host of network topologies and network infrastructures, such as client/server, peer-to-peer, or hybrid architectures, can be utilized. One or more of these network topologies can be employed by offer-for-access provisioning component 120 for communicating with a network, e.g., within network environment 200. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

It is to be noted that aspects, features, or advantages of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the disclosed subject matter as disclosed in the subject specification can be exploited in legacy telecommunication technologies; e.g., GSM. In addition, mobile as well non-mobile networks (e.g., Internet) can exploit aspects or features described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one memory to store computer-executable instructions; and
   at least one processor, communicatively coupled to the at least one memory, that facilitates execution of the computer-executable instructions to at least:
      provide a complementary access of a first traffic type of a network to a device without a per-access fee to a user account associated with the device;
      receive, from the device, a request for an alternate access of a second traffic type of the network;
      determine, by a monitor component of the system, whether a present characteristic of the network comprising consumption of network traffic by a network device of the network satisfies a defined condition with respect to the alternate access of the second traffic type;
      in response to the present characteristic of the network being determined to satisfy the defined condition with respect to the alternate access of the second traffic type, send an offer directed to the device for purchase of the alternate access of the second traffic type with the per-access fee to the user account; and
      in response to the present characteristic of the network being determined not to satisfy the defined condition with respect to the alternate access of the second traffic type, withholding the offer, wherein the alternate access of the second traffic type is associated with a second data transfer rate that is greater than a first data transfer rate associated with the complementary access of the first traffic type.

2. The system of claim 1, wherein the at least one processor further facilitates the execution of the computer-executable instructions to, based on an input received from the device representing an acceptance of the offer, provide the alternate access to the device.

3. The system of claim 2, wherein the at least one processor further facilitates the execution of the computer-executable instructions to apply the per-access fee to the user account.

4. The system of claim 1, wherein the first traffic type comprises at least one of text, a rich site summary feed, or an email.

5. The system of claim 1, wherein the second traffic type comprises at least one of a video stream, an audio stream, or hypertext transfer protocol secure based information.

6. The system of claim 1, wherein the first traffic type is associated with a first quality of service that is lower in quality than a second quality of service associated with the second traffic type.

7. The system of claim 1, wherein the present characteristic comprises a rate of data transfer.

8. The system of claim 1, wherein the offer is directed to the device via at least one of a plug-in of an Internet browser of the device or an application of an operating system of the device.

9. The system of claim 1, wherein the present characteristic comprises at least one of a quality of service, a radio condition associated with the device, a utilization of a resource of a base station associated with the device, an amount of resources allocated to the base station, or a type of the resource allocated to the base station.

10. A method, comprising:
    providing, by a system comprising a processor, a first access of a first type of traffic of a network to a device without a per-access fee to a user account associated with the device;
    receiving, by the system, a request for a second access of a second type of traffic of the network from the device;
    in response to determining, by the system, that a current characteristic of the network comprising consumption of network traffic by a network device of the network satisfies a defined condition with respect to the second access, sending, by the system, an offer directed to the device for purchase of the second access with the per-access fee to the user account; and
    in response to determining, by the system, that the current characteristic of the network comprising the consumption of network traffic by the network device does not satisfy the defined condition with respect to the second access, withholding, by the system, the offer, wherein the first access is based on a first data rate that is less than a second data rate of the second access.

11. The method of claim 10, further comprising:
    in response to receiving an input from the device representing an acceptance of the offer, providing, by the system, the second access to the device.

12. The method of claim 11, further comprising:
    charging, by the system, the per-access fee to the user account.

13. The method of claim 11, wherein the providing the second access comprises:
    providing access to at least one of a video stream, an audio steam, or hypertext transfer protocol secure based information.

14. The method of claim 10, wherein the sending comprises:
    sending the offer directed to the device via at least one of a plug-in of an Internet browser of the device or an application of an operating system of the device.

15. The method of claim 10, where the determining that the current characteristic of the network satisfies the defined condition further comprises:

determining, by the system, whether at least one of a rate of data transfer, a quality of service, a radio condition associated with the device, a utilization of a resource of a base station associated with the device, an amount of resources allocated to the base station, or a type of the resource allocated to the base station satisfies the defined condition.

16. The method of claim 10, wherein the providing the first access comprises:
  providing access to at least one of text, a rich site summary feed, or an email.

17. A computer-readable storage medium comprising computer executable components that, in response to execution, cause a computing system comprising a processor to perform operations, comprising:
  providing, based on a first data rate, an initial access of a first traffic type of a network to a device without a fee to a user account associated with the device;
  receiving a request from the device for a substitute access, based on a second data rate, of a second traffic type of the network;
  in response to determining, by a monitor component of the computing system, that a consumption of network traffic by a network device of the network satisfies a defined condition with respect to the substitute access, sending an offer directed to the device for purchase of the substitute access with the fee to the user account; and
  in response to determining that the consumption of the network traffic by the network device does not satisfy the defined condition with respect to the substitute access, withholding the offer, wherein the second data rate is higher than the first data rate.

18. The computer-readable storage medium of claim 17, wherein the operations further comprise:
  in response to receiving an input from the device representing an acceptance of the offer, providing, based on the second data rate, the substitute access to the device.

19. The computer-readable storage medium of claim 18, wherein the operations further comprise:
  charging the fee to the user account.

20. The computer-readable storage medium of claim 17, wherein the sending the offer comprises sending the offer directed to the device via at least one of a plug-in of an Internet browser of the device or an application of an operating system of the device.

* * * * *